Jan. 29, 1963

D. ENGELSMANN 3,075,438

EXPOSURE CONTROL FOR CAMERAS

Filed Aug. 11, 1959

INVENTOR.
DIETER ENGELSMANN
BY Michael S. Striker
Attorney

Jan. 29, 1963    D. ENGELSMANN    3,075,438
EXPOSURE CONTROL FOR CAMERAS
Filed Aug. 11, 1959    2 Sheets-Sheet 2

INVENTOR.
DIETER ENGELSMANN
BY Michael S Striker
Attorney

United States Patent Office
3,075,438
Patented Jan. 29, 1963

3,075,438
EXPOSURE CONTROL FOR CAMERAS
Dieter Engelsmann, Munich, Germany, assignor to Agfa Aktiengesellschaft, Leverkusen, Germany
Filed Aug. 11, 1959, Ser. No. 832,941
Claims priority, application Germany Aug. 20, 1958
24 Claims. (Cl. 95—10)

The present invention relates to cameras.

More particularly, the present invention relates to those cameras in which the size of the exposure aperture and the exposure time are automatically adjusted in accordance with the sensing of the lighting conditions by a light meter.

With cameras of this type the exposure time is not continuously adjustable. The structure which controls the exposure time forms part of the shutter assembly, and this exposure time is capable of being set only in steps in all practical cameras. It is of course possible to provide a camera with a continuously infinitely variable exposure time setting structure, but the cost of such a structure is prohibitive and therefore such exposure time setting arrangements are not used. Inasmuch as the exposure time can only be set at certain predetermined steps, it is clear that there is an inaccuracy in present day cameras. Thus, the light meter will sense certain lighting conditions which will indicate a certain combination of exposure time and exposure aperture, and with the conventional cameras there is a certain range of exposure times which will all be indicated on a single step at which the exposure time structure can be set, so that even though the light meter might very precisely indicate a very accurate combination of exposure time and exposure aperture, the conventional cameras are not capable of making precise use of this indication since the exposure time can only be set at certain predetermined fixed values without any possible variation in between these values. As a result, the accuracy with which the light meter is capable of sensing the lighting conditions simply has no significance in most cameras and is simply wasted.

One of the objects of the present invention is to overcome the above drawbacks by providing a camera which will be capable of very accurately determining the combination of exposure time and aperture in accordance with the precise indications derived from the light meter.

Another object of the present invention is to provide a camera which not only is capable of precisely utilizing the precise indications derived from the light meter, but which also is relatively inexpensive and certainly not substantially more expensive than conventional cameras.

It is still another object of the present invention to provide a camera which will automatically give precise continuously variable combinations of exposure time and exposure aperture so as to make full use of the accuracy of the light meter while at the same time using the conventional stepped exposure time setting apparatus normally included in the shutter assembly of cameras.

It is a further object of the present invention to provide an apparatus of the above type which is capable of being adapted to a desired combination of exposure time and exposure aperture over the entire range of possible exposure time and exposure aperture values.

Also, the objects of the present invention include the provision of structure capable of accomplishing all of the above objects and at the same time being composed of simple rugged components which are very reliable in operation.

With the above objects in view the present invention includes in a camera a pair of simultaneously operable means for determining the exposure of film in the camera, and one of these means is stepped and remains at given values at its several steps, respectively, the value of this one means changing during transition from one of its steps to the succeeding step. In accordance with the present invention the other of the above means continuously changes its value while the said one means remains at each of its steps so that in this way a continuously variable setting for the exposure of the film is obtained.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

Figure 1:
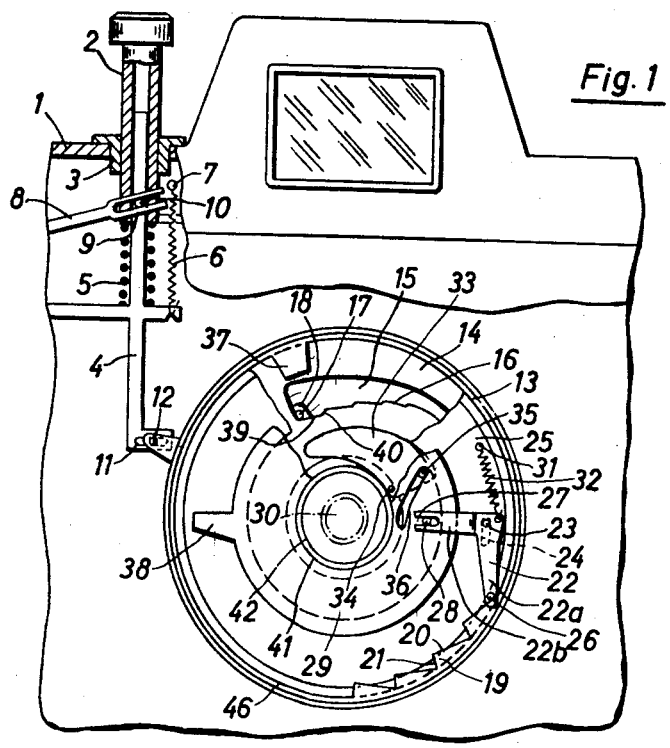
FIG. 1 is a fragmentary front elevation showing the manner in which the structure of the invention is incorporated into a camera.

Referring now to FIG. 1, there is shown therein the top wall 1 of a camera housing, this top wall carrying a guide sleeve 3 in which the manually operable shutter release plunger 2 is axially slidable. It will be seen that this plunger 2 is hollow and is provided with an axial bore in which the upper portion of a rod 4 is freely slidable. This rod 4 forms part of a connecting means which connects the plunger 2 to the structure of the invention which sets the combination of exposure time and exposure aperture, so that this rod 4 forms part of the structure for transmitting movement of the plunger 2 to the structure of the invention.

As may be seen from FIG. 1 the rod 4 has a cross arm and the bottom end of the coil spring 5 engages this cross arm and is coiled around the rod 4 over this cross arm, the top end of the coil spring 5 engaging the bottom end of the plunger 2. A spring 6 which is weaker than the spring 5 is connected at one end to the rod 4 and at its opposite end to a stationary pin 7. Thus, the spring 6 urges the rod 4 upwardly, as viewed in FIG. 1.

A lever 8 has a bifurcated end 9 in which is located a pin 10 which is fixed to the rod 4 and located in a slot of plunger 2, so that axial movement of the plunger 2 will produce turning of the lever 8. This lever 8 is turned during the initial operation of the plunger 2 for actuating a clamping device which clamps the light meter so as to temporarily stop the operation thereof during the actual exposure operations and also so as to provide through an unillustrated conventional structure not forming part of the present invention a positioning in an automatic manner of a stop which will determine the end position of the motion transmitting rod 4 during actuation of the plunger 2, so that in this way the combination of exposure time and exposure aperture will be automatically determined, as will be apparent from the description which follows. Thus, with this structure the downward movement of the plunger 2 will result in downward movement of the rod 4 until the latter is stopped by the stop whose position is automatically determined by the light meter, and then during the continued downward movement of the plunger 2 the spring 5 is compressed beyond the point illustrated in FIG. 1 while the plunger 2 moves downwardly with respect to the rod 4 in order to release the shutter and make the actual exposure.

At its lower end the rod 4 is formed with a transverse slot 11 in which a pin 12 is guided. This pin 12 is fixed to an annular member 13 which is turnable around the optical axis and which is in addition coaxial with the optical axis. The annular member 13, which thus turns as a result of axial movement of the rod 4, has a wall 14 which is in a plane normal to the optical axis and which is formed with a cutout 15 whose lower edge has a series of steps providing the control cam 16 for determining the exposure time. A follower 17 cooperates with the camming edge 16 and this follower 17 is in the form of a pin fixed to a lever 18 which in an unillustrated and purely conventional manner actuates the timing mechanism of the shutter assembly according to the particular step of the camming edge 16 which is engaged by the follower 17. The annular member 13 is also provided at a location angularly displaced from the camming edge 16 with a saw-tooth cam portion 19, this cam 19 also being formed in a part of the wall 14 of the annular member 13. As is apparent from the drawing, the annular member 13 has a flange which surrounds the optical axis, and the wall 14 extends inwardly from this flange, this flange of the member 13 being itself located within a tubular housing of the objective assembly so as to be guided by the wall of this tubular housing for turning movement, and the pin 12 is fixed to a lug which extends from the flange of the annular member 13 through an arcuate slot formed in the outer tubular housing of the objective assembly.

Each of the teeth of the saw-tooth cam 19 is provided with an edge portion 20 which extends along a spiral with respect to the optical axis and with an edge portion 21 which extends substantially radially with respect to the optical axis.

A portion of the shutter housing 25 is visible in FIG. 1, and the wall of the shutter housing 25 which is shown in FIG. 1 is formed with an elongated slot 24 in which a pin 23 is located for movement along this slot. The pin 23 is fixed to a bell crank 22 so as to connect the latter to the housing of the shutter assembly for turning movement. A spring 32 is connected at 31 to the shutter housing and at its opposite end to the bell crank 22 for maintaining the pin 23 at the upper end of the slot 24, in the position of the parts illustrated in FIG. 1. The bell crank 22 has a lower arm 22a which carries a follower pin 26, and this follower pin 26 cooperates with the saw-tooth cam 19. The other arm 22b of the bell crank 22 is formed with an elongated slot or notch 27 in which a pin 28 is located, and this pin 28 is fixed to a diaphragm operating ring 29 which is also supported for turning movement around the optical axis. The ring 29 is formed with a series of slots 36 one of which is shown in FIG. 1, and the pins 35 of the several diaphragm blades 33 extend through the slots 35, respectively. These several diaphragm blades 33 are respectively supported by the pivot pins 34 carried by the shutter housing 25 for turning movement about the axes of these pivot pins 34, respectively, and thus it is clear that as the ring 29 is turned in one direction or the other several blades 33 will turn so as to increase or decrease the size of the exposure aperture. Only one diaphragm blade 33 and the structure operating therewith is shown in the drawing for the sake of clarity. The optical axis of the objective is indicated at 30 in FIG. 1. The diaphragm operating ring 29 also is provided with an outwardly directed projection 38 fixed to the ring 29, and the annular member 13 is provided with an inwardly directed projection 37, and these projections 37 and 38 are located in a common plane so that during turning of the members 29 and 13 with respect to each other in a manner described below these projections 37 and 38 will engage each other to form a pair of motion transmitting elements for providing a part of the adjustment of the aperture, as will be apparent from the description which follows.

In the position of the parts which is illustrated in FIG. 1 the diaphragm is fully open. Thus, is has the largest size possible with the automatic control from the light meter, this size being, for example, an aperture which will provide a stop value of 5.6. Also, in the initial position of the parts shown in FIG. 1, the exposure time is set at the largest possible value for the automatic control structure, this value being, for example, 1/30 of a second. Assuming now that the annular member 13 is turned in a counterclockwise direction, as viewed in FIG. 1, either manually or by operation of the plunger 2, then it is clear that the follower 26 will be actuated by the spiral edge portion of the first tooth of the cam 19 while the follower 17 at the same time engages the first step 39 of the cam 16. While the follower 17 moves or is placed in engagement with the edge of the step 39 from the starting end of this step to the final end thereof, the exposure time setting will not change. However, when the end of the step 39 reaches the follower 17, the transition portion 40 between the first two steps of the cam 16 will engage the follower 17 so as to move the latter and then the follower 17 will come into engagement with the second step of the cam 16, and the transition portion 40 of the cam 16 changes the exposure time from 1/30 of a second to 1/60 of a second, so that during the time that the follower 17 remains in engagement with the second step of the cam 16 the exposure time will remain set at 1/60 of a second.

The ring or annular member 13 serves as a means for interconnecting the cams 16 and 19 for turning movement together around the optical axis, and the teeth of the cam 19 and the steps of the cam 16 are positioned so as to operate in synchronism with the followers 26 and 17, respectively, the angular length of the several teeth of the cam 19 being equal to the angular length of the several steps of the cam 16. As a result, during the time that the step 39 of the cam 16 remains in engagement with the follower 17 while the cams both turn around the optical axis, the first tooth of the cam 19 remains in engagement with and moves with respect to the follower 26. As a result the spiral edge portion 20 of the first tooth of the cam 19 continuously turns the follower 26 around the axis of the pin 23 so that the bell crank 22 turns in a clockwise direction during this counterclockwise turning of the cams, as viewed in FIG. 1, and as a result the diaphragm operating ring 29 will at this time also turn in a counterclockwise direction, as viewed in FIG. 1, so that the size of the exposure aperture is continuously changing while the exposure time remains constant during this initial cooperation of the followers 17 and 26 with the first step 39 of the cam 16 and with the first tooth of the cam 19, respectively. As is apparent from FIG. 1, the diaphragm will have its aperture reduced by movement of the edge 20 with respect to the follower 26 from the size indicated by the circle 41 of FIG. 1 to the size indicated by the circle 42 of FIG. 1. This reduction in the aperture size corresponds to a stop value of approximately 0.8, and this stop value also corresponds to a change in exposure time from 1/30 of a second to 1/60 of a second. In other words, the total light which reaches the film is determined by the combination of exposure time and the size of the exposure aperture. The amount of light reaching the film can be reduced either by reducing the exposure time or by reducing the size of the exposure aperture. The same results, which is to say a predetermined amount of light reaching the film, can be produced either by maintaining the exposure time constant while reducing the aperture or by maintaining the aperture constant and reducing the exposure time. With the invention the simple exposure time structure is maintained so that the exposure time is adjusted according to predetermined set values determined by the several steps of the cam 16, but while the exposure time remains constant at each of the several steps the diaphragm is automatically operated upon by the structure of the invention so as to be reduced in a manner which will exactly compensate for the change in light value determined by the light meter. Thus, the continuously changing diaphragm size provides the same results which would be obtained if the diaphragm were maintained at a constant aperture and instead a far more expensive but far more precise exposure time setting cam were provided.

During engagement of the transition portion 40 of the cam 16 with the pin 17 the edge portion 21 of a tooth of a cam 19 cooperates with the pin or follower 26, so that during the time when the exposure time setting is actually being changed the bell crank 22 turns in a counterclockwise direction so as to turn the ring 29 is a clockwise direction, as viewed in FIG. 1, and thus the size of the exposure aperture is increased and in the embodiment of FIG. 1 the exposure aperture returns to its original size at the end of the movement of the follower 26 along the edge portion 21 of a tooth of the cam 19 in a direction away from the optical axis. This same operation of the diaphragm will be automatically repeated for the several steps of the cam 16. In this way the structure of the invention provides a continuously variable setting of the total light which can reach the film by varying the diaphragm in an automatic manner during the time that the exposure time remains constant.

Figure 2:
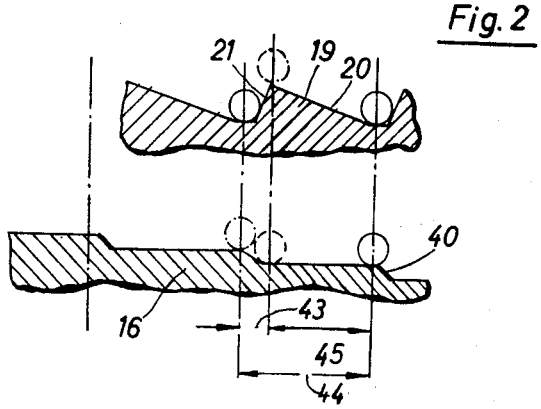
FIG. 2 is a developed view of portions of a pair of cams of the structure of the invention and FIG. 2 illustrates the phase relationship of these cams.

The cams 19 and 16 are shown in a developed fragmentary view in FIG. 2. As is apparent from FIG. 2, the steps of the cam 16 are in phase with the teeth of the cam 19. Furthermore, it is apparent that the transition along the surface 40 from one step to the next does not take place at a single point and also of course the movement of the follower 26 along a surface 21 does not take place at a single point. As is apparent from FIG. 2, the transition phase 43 of the operation forms a relatively small fraction of the total angular distance 44 required for a complete cycle of operations to take place with respect to the movement of the teeth and steps of the cams 19 and 16, respectively. It is clear that a continuously variable total light value is provided in a very accurate manner while the followers are in the range 45 of the operations indicated in FIG. 2. It is in this range 45 that the exposure time does not change while on the other hand the size of the aperture is continuously changing. However, it is clear that during the transition phase of the operations the diaphragm is automatically regulated also in correlation to the exposure time. Thus, during the transition of the follower 17 along a portion 40 of the cam 16 while the exposure time is actually being reduced, the follower 26 is moving along an edge 21 increasing the size of the aperture, so that even in the transition phase the structure of the invention correlates the size of the aperture with the exposure time and provides also at the transition phase a relatively accurate total light value.

In the embodiment of the invention which is illustrated in FIG. 1, when the last tooth of the cam 19 has moved past the follower 26, the exposure time will have been set at its smallest value of 1/500 of a second, for example, and then during the continued turning of the annular member 13 in a counterclockwise direction, as viewed in FIG. 1, the circular edge 46 will engage the follower 26 so that no further diaphragm adjustment will be provided through the follower 26 and the lever 22. However, at this time, which is to say when the teeth of the cam 19 have turned beyond the follower 26, the stop projection 37 of the member 13 will have reached and engaged the stop projection 38 of the diaphragm operating ring 29, and thus the continued turning of the annular member 13, which is to say the continued turning of the cams 16 and 19, will now result in turning of the ring 29 through the cooperation of the elements 37 and 38, and thus while the exposure time remains constant at its minimum value the diaphragm aperture is continuously reduced in size so as to provide the best possible exposure even under these conditions. Of course, beyond the last step of the cam 16 the edge of this can is perfectly circular so that no further adjustment of the exposure time takes place, and also it will be noted that when the ring 29 is turned by cooperation of the stop members 37 and 38 the lever 22 will be turned in a clockwise direction, as viewed in FIG. 1, so that the follower 26 will move away from the edge 46.

As was indicated above, this adjustment of the combination of exposure time and exposure aperture will take place as long as the rod 4 moves downwardly, and the extent of downward movement of the rod 4 is determined by the automatic positioning of an unillustrated stop whose position is controlled from the light meter in a manner which does not form part of the present invention. Once the lower end position of the rod 4 is determined in this way, the exposure time and exposure aperture will have been set, and then the continued downward movement of the plunger 2 will result in release of the shutter. Thereafter, the operator releases the shutter operating plunger 2 and the parts return to their starting position illustrated in FIG. 1. The spring 6 returns the parts to the illustrated position, while the spring 5 moves the plunger 2 upwardly to the position shown in FIG. 1 with respect to the rod 4. When during the return of the parts to their starting position the follower 26 is engaged by an edge 21 of a tooth of the cam 19, the pin 28 acts as the fulcrum of the lever 22, and the latter now turns around the pin 28, the pin 23 moving along the slot 24 at this time, and this action takes place until the pin 26 moves beyond the intersection between the edge portions 21 and 20 of each tooth of the cam 19. While the follower 26 engages the surface portion 20 the bell crank 22 turns around the pin 23 and the spring 32 maintains the pin 23 at the top end of the slot 24.

Figure 3:
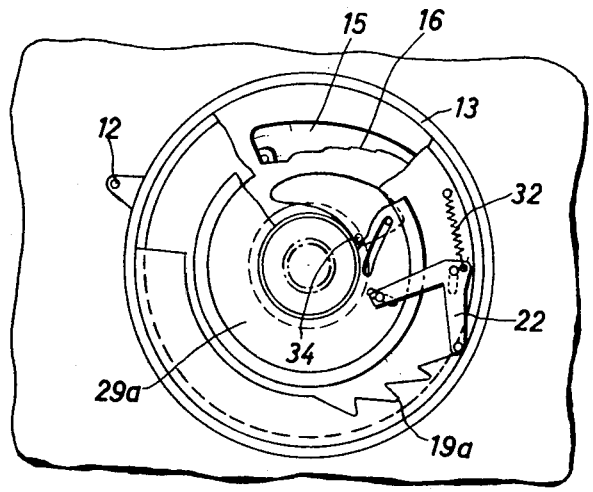
FIG. 3 shows a modification of the structure of FIG. 1.

The embodiment of the invention which is illustrated in FIG. 3 differs from that described above only with respect to the cam 19. In FIG. 3 a cam 19a is provided, and it will be noted that this cam 19a has its teeth extending along a spiral with respect to the optical axis. Thus, with the structure of FIG. 3 the diaphragm is being continuously adjusted even during cooperation of the teeth of the cam 19a with the lever 22, and the adjustments provided by the teeth 19a so as to compensate for the stepped cam 16 are simply superposed on the continuous adjustment of the diaphragm provided by the spirally arranged teeth of the cam 19a as well as the rest of the cam which controls the diaphragm. Thus, with the embodiment of FIG. 3 structure corresponding to the stops 37 and 38 no longer is required, and the entire adjustment of the diaphragm takes place through the lever 22. Therefore, with the embodiment of FIG. 3, while the cam 16 has its successive steps placed in engagement with the follower of the exposure time setting mechanism, the lever 22 will turn back and forth so as to provide a continuously variable total light value compensating for the constant exposure time at each of the steps of the cam 16, but on the other hand the lever 22 does not return after each of the steps of the cam 19a to its original position but instead maintains a certain permanent change in the diaphragm size so that the diaphragm size is also changing continuously with this embodiment and of course eventually this diaphragm reaches the minimum value indicated by the inner edge of the cam 19a located beyond the teeth of this cam. Thus, the operating ring 29a of the diaphragm of FIG. 3 does not have a projection corresponding to the projection 38 of FIG. 1.

Figure 4:
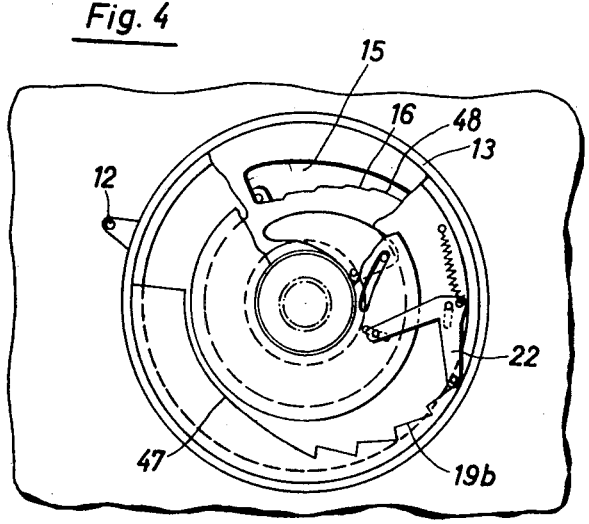
FIG. 4 shows a still further modification of the structure.

The embodiment of FIG. 4 is similar to that of FIG. 3 in that the teeth of the cam 19b are also arranged along the spiral so that with this embodiment also the diaphragm is being continuously adjusted and the teeth of the cam 19b are simply superposed on this adjustment so as to compensate for the stepped arrangement of the exposure time setting mechanism. However, while with the embodiment of FIG. 3 the final adjustment is reached by the time the teeth of the cam 19a have moved through a relatively slight distance beyond the follower of the lever 22, with the embodiment of FIG. 4 the cam 19b includes beyond the teeth thereof a spiral edge portion 47 which continues the reduction in the size of the diaphragm during a substantial angular distance of turning of the element beyond the point when the last tooth of the cam 19b has moved beyond the follower of the lever 22. During the time that the spiral edge 47 engages the follower 26 carried by the lever 22, the circular edge 48 of the cam 16 is in engagement with the follower 17 of the exposure time setting cam, so that during this time the exposure time remains constant while the size of the diaphragm aperture is continuously becoming smaller.

Instead of the arrangement illustrated in FIG. 4, a portion of the spiral curve 47 can be located in advance of the saw teeth of the cam 19b, while another portion of this curve 47 can be located subsequent to the saw teeth, as indicated in FIG. 4, so that it is clear that with the structure of the invention all sorts of variations in the combinations of the exposure time and exposure aperture are easily possible. Thus, it is possible to provide a cam structure giving a desired combination of exposure time and exposure aperture at each angular position of the ring 13, and the variation in the combination of exposure time and exposure aperture can take place along any desired curve in a very simple way through very simple variations in the cam 19, 19a, or 19b of the structure of the invention.

As is apparent from FIG. 2, the phase 45 of the operation corresponds to approximately 80% of the total cycle indicated by the angular distance 44.

Also, it will be noted that the spring 32 of FIG. 1 performs two functions. On the one hand it serves to maintain the follower 26 in engagement with the cam 19, and on the other hand this spring serves to urge the pin 23 toward the top end of the slot 24.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, stepped exposure time setting means having a plurality of positions providing given exposure times which remain constant during part of the movement of said setting means from one position to the next; and diaphragm setting means providing an exposure aperture which with the exposure time set by said exposure time setting means gives a certain total light value, said diaphragm setting means being operatively connected to said exposure time setting means and automatically actuated thereby for continuously changing the aperture during said part of the movement of said exposure time setting means from one position to the next position, in a manner providing the same total light value which would be provided if said exposure time setting means were continuously adjustable.

2. In a camera, in combination, stepped exposure time setting means having a plurality of positions providing given expuosure times which remain constant during part of the movement of said exposure time setting means from one position to the next and which change during the remainder of the movement of said exposure time setting means from one position to the next; and diaphragm setting means providing an exposure aperture which with the exposure time set by said exposure time setting means gives a certain total light value, said diaphragm setting means being operatively connected to said exposure time setting means and automatically actuated thereby for continuously changing the aperture during said part and said remainder of the movement of said exposure time setting means from one position to the next, in a manner providing the same total light value which would be provided if said exposure time setting means were continuously adjustable, the change in aperture being in one direction during said part of said movement of said time setting means from one position to the next and in an opposite direction during said remainder of the movement of said time setting means from one position to the next.

3. In a camera, in combination, stepped exposure time setting means having an initial step providing the longest exposure time and a plurality of succeeding steps each providing a shorter exposure time than the immediately preceding step, the exposure time remaining constant while said setting means remains at each step while moving from one end thereof to the other end thereof and the exposure time changing from a given value to a smaller value during transition of said setting means from said other end of the one step to said one end of the next step; and diaphragm setting means providing an exposure aperture which with the exposure time set by said exposure time setting means gives a certain total light value, said diaphragm setting means being operatively connected to said exposure time setting means and automatically actuated thereby for continuously reducing the aperture, during movement of said exposure time setting means along each of its steps from said one end to said other end of each step, in a manner providing the same total light value which would be provided if said exposure time setting means were continuously adjustable.

4. In a camera, in combination, stepped exposure time setting means having an initial step providing the longest exposure time and a plurality of succeeding steps each providing a shorter exposure time than the immediately preceding step, the exposure time remaining constant while said setting means remains at each step while moving from one end thereof to the other end thereof and the exposure time changing from a given value to a smaller value during transition of said setting means from said other end of one step to said one end of the next step; and diaphragm setting means operatively connected to and automatically actuated by said exposure time setting means for continuously reducing the aperture during movement of said exposure time setting means along each of its steps from said one end to said other end of each step and for increasing the aperture, during transition of said exposure time setting means from said other end of one step to said one end of the next step, said diaphragm setting means providing with said exposure time setting means a total light value at least approximately equal to the total light value which would be provided if said exposure time setting means were continuously adjustable.

5. In a camera, in combination, stepped exposure time setting means having an initial step providing the longest exposure time and a plurality of succeeding steps each providing a shorter exposure time than the immediately preceding step, the exposure time remaining constant while said setting means remains at each step while moving from one end thereof to the other end thereof and the exposure time changing from a given value to a smaller value during transition of said setting means from said other end of one step to said one end of the next step; and diaphragm setting means operatively connected to said exposure time setting means and automatically actuated thereby for continuously reducing the aperture during movement of said exposure time setting means along each of its steps from said one end to said other end of each step and for increasing the aperture during transition of said exposure time setting means from said other end of one step to said one end of the next step, and the aperture range provided by said diaphragm setting means being substantially the same for all of said steps, said diaphragm setting means providing with said exposure time setting means a total light value which is approximately equal to the total light value which would be provided if said exposure time setting means were continuously adjustable.

6. In a camera, in combination, a stepped exposure time setting cam turnable around the optical axis and having a plurality of steps angularly distributed part-way about the optical axis a first follower cooperating with said steps of said cam for setting the exposure time according to the angular position of said cam; a saw-tooth diaphragm setting cam connected to said time setting cam for turning movement therewith around the optical axis and having a plurality of teeth equal in number to the number of steps and also angularly distributed part-way about the optical axis extending respectively through the same angular distances as the steps of said time setting cam; a second follower cooperating with said diaphragm setting cam in synchronism with the cooperation of said first follower with said time setting cam; a diaphragm; and motion transmitting means transmitting movement of said second follower to said diaphragm for changing the aperture size in one direction during movement of each tooth and said second follower relative to each other synchronously wtih the movement of each step and said first follower relative to each other and for changing the aperture size in an opposite direction during transition of said second follower from one tooth to the next during synchronous transition of said first follower from one step to the next, the aperture provided by said saw-tooth diaphragm setting cam, second follower, and motion transmitting means together with the exposure time provided by said time setting cam and first follower giving a total light value which is the same as the total light value which would result if said exposure time setting cam and first follower provided a continuously adjustable exposure time.

7. In a camera, in combination, a stepped exposure time setting cam turnable around the optical axis; and having a plurality of steps angularly distributed part-way about the optical axis a first follower cooperating with said steps of said cam for setting the exposure time according to the angular position of said cam; a saw-tooth diaphragm setting cam connected to said time setting cam for turning movement therewith around the optical axis and having a plurality of teeth equal in number to the number of steps and also angularly distributed part-way about the optical axis extending respectively through the same angular distances as the steps of said time setting cam; a second follower cooperating with said diaphragm setting cam in synchronism with the cooperation of said first follower with said time setting cam; a diaphragm; and motion transmitting means transmitting movement of said second follower to said diaphragm for changing the aperture size in one direction during movement of each tooth and said second follower relative to each other synchronously with the movement of each step and said first follower relative to each other and for changing the aperture size in an opposite direction during transition of said second follower from one tooth to the next during synchronous transition of said first follower from one step to the next, the aperture provided by said saw-tooth diaphragm setting cam, second follower, and motion transmitting means together with the exposure time provided by said time setting cam and first follower giving a total light value which is the same as the total light value which would result if said exposure time setting cam and first follower provided a continuously adjustable exposure time, each tooth having a first surface extending along a spiral with respect to the optical axis and corresponding to a step of said time setting cam, and each tooth having a second surface extending substantially radially with respect to the optical axis and corresponding to the transition of said time setting cam from one step to the next.

8. In a camera as recited in claim 6, said motion transmitting means including a diaphragm operating ring surrounding the optical axis and a bell crank connected at one end to said ring and at its opposite end to said second follower.

9. In a camera as recited in claim 6, said motion transmitting means including a diaphragm operating ring surrounding the optical axis and a bell crank connected at one end to said ring and at its opposite end to said second follower, the connection between said bell crank and ring being a pin-and-slot connection.

10. In a camera as recited in claim 6, said motion transmitting means including a diaphragm operating ring surrounding the optical axis and a bell crank connected at one end to said ring and at its opposite end to said second follower, a shutter housing surrounding the optical axis and said bell crank being pivotally connected intermediate its ends to said shutter housing, and a spring cooperating with said bell crank for urging the latter to turn in a direction which maintains said second follower in engagement with said diaphragm setting cam.

11. In a camera as recited in claim 6, said motion transmitting means including a diaphragm operating ring surrounding the optical axis and a bell crank connected at one end to said ring and at its opposite end to said second follower, a shutter housing surrounding the optical axis and said bell crank being pivotally connected intermediate its ends to said shutter housing, and a spring cooperating with said bell crank for urging the latter to turn in a direction which maintains said second follower in engagement with said diaphragm setting cam, said shutter housing being formed with a slot and said bell crank carrying a pivot pin which extends through and is movable along said slot, said spring maintaining said pivot pin at one end of said slot.

12. In a camera, in combination, a stepped exposure time setting cam turnable around the optical axis and having a plurality of steps angularly distributed part-way about the optical axis; a first follower cooperating with said steps of said cam for setting the exposure time according to the angular position of said cam; a saw-tooth diaphragm setting cam connected to said time setting cam for turning movement therewith around the optical axis and having a plurality of teeth equal in number to the number of steps and also angularly distributed part-way about the optical axis extending respectively through the same angular distances as the steps of said time setting cam; a second follower cooperating with said diaphragm setting cam in synchronism with the cooperation of said first follower with said time setting cam; a diaphragm; and motion transmitting means transmitting movement of said second follower to said diaphragm for changing the aperture size in one direction during movement of each tooth and said second follower relative to each other synchronously with the movement of each step and said first follower relative to each other and for changing the aperture size in an opposite direction during transition of said second follower from one tooth to the next during synchronous transition of said first follower from one step to the next, the aperture provided by said saw-tooth diaphragm setting cam, second follower, and motion transmitting means together with the exposure time provided by said time setting cam and first follower giving a total light value which is the same as the total light value which would result if said exposure time setting cam and first follower provided a continuously adustable exposure time, and the change in light value provided by movement of said second follower and each tooth relative to each other being substantially equal to the change in light value during the transition of said first follower from one step to the next.

13. In a camera, in combination, a stepped exposure time setting cam turnable around the optical axis and having a plurality of steps angularly distributed part-way about the optical axis; a first follower cooperating with said steps of said cam for setting the exposure time according to the angular position of said cam; a saw-tooth diaphragm setting cam connected to said time setting cam for turning movement therewith around the optical axis, and having a plurality of teeth equal in number to the number of steps and also angularly distributed part-way about the optical axis extending respectively through the same angular distances as the steps of said time setting cam; a second follower cooperating with said diaphragm setting cam in synchronism with the cooperation of said first follower with said time setting cam; a diaphragm; and motion transmitting means transmitting movement of said second follower to said diaphragm for changing the aperture size in one direction during movement of each tooth and said second follower relative to each other synchronously with the movement of each step and said first follower relative to each other and for changing the aperture size in an opposite direction during transition of said second follower from one tooth to the next during synchronous transition of said first follower from one step to the next, the aperture provided by said saw-tooth diaphragm setting cam, second follower, and motion transmitting means together with the exposure time provided by said time setting cam and first follower giving a total light value which is the same as the total light value which would result if said exposure time setting cam and first follower provided a continuously adjustable exposure time, and the change in light value provided by movement of said second follower and a surface of each tooth relative to each other being substantially equal to the change in light value during the transition of said first follower from one step to the next, the change in light value provided by movement of said second follower and a second surface of each tooth relative to each other being at least as great as the change in light value from one step to the next of said time setting cam.

14. In a camera as recited in claim 6, said motion transmitting means including a diaphragm operating ring surrounding the optical axis and a bell crank connected at one end to said ring and at its opposite end to said second follower, a first stop carried by said diaphragm operating ring and a second stop fixed to said cams for turning movement therewith, said first stop being located in the path of turning movement of said second stop and the latter reaching said first stop when said followers and cams are beyond each other so that continued turning of said cams beyond said followers will further adjust the diaphragm.

15. In a camera as recited in claim 6, the radial distances of the several teeth of said diaphragm setting cam from the optical axis being different from each other, respectively.

16. In a camera as recited in claim 6, said time setting cam having an arcuate camming edge located beyond the steps thereof at a constant radial distance from the optical axis for providing no change in exposure time while said first follower cooperates with said arcuate camming edge and said diaphragm setting cam having beyond said saw teeth a spiral camming edge extending along a spiral with respect to said optical axis and cooperating wtih said second follower for changing only the diaphragm when the steps of said time setting cam and teeth of said diaphragm setting cam are respectively located beyond said first and second followers.

17. In a camera as recited in claim 6, a manually operable shutter release plunger, connecting means connecting said plunger to said cams for turning the latter during actuation of said plunger, and an adjustable stop means cooperating with said connecting means for stopping the transmission of movement of said plunger to said cams so that thereafter the plunger will continue to move, without turning said cams, so as to release the shutter.

18. In a camera, in combination, movable exposure time setting means adapted to set during each of a plurality of consecutive periods of its movement a different exposure time which remains constant during at least a substantial part of the respective period of said movement; movable diaphragm setting means adapted to provide during each of a plurality of consecutive periods of its movement a diaphragm aperture which varies between a minimum and a maximum magnitude at least during a substantial part of the respective period of said movement of said movable diaphragm setting means; and means for simultaneously moving said exposure time setting means and said diaphragm setting means in such a manner that their consecutive periods of movement coincide whereby, during each of said substantial parts of the periods of movement if said exposure time and diaphragm setting means, the respective exposure time will remain unchanged while the diaphragm aperture will vary continuously.

19. In a camera, in combination, movable, exposure time setting means having a plurality of consecutive positions providing given exposure times which remain unchanged during movement of said setting means from one position toward but short of the next position; adjustable diaphragm setting means providing a diaphragm aperture which, with the exposure time set by the exposure time setting means, gives a certain total light value; and means for moving said exposure time setting means between said consecutive positions, said moving means operatively connected with said diaphragm setting means for continuously adjusting said diaphragm setting means between two spaced end positions in each position of said exposure time setting means so as to continuously change the diaphragm aperture at least during such intervals when the exposure times set by said exposure time setting means in the respective positions thereof remain unchanged.

20. In a camera, in combination, movable exposure time setting means having a plurality of consecutive positions providing given exposure times which remain unchanged during movement of said setting means from one position toward but short of the next position and which are changed suddenly during actual movement of the setting means from one position into the next position; adjustable diaphragm setting means providing a diaphragm aperture which, with the exposure time set by said exposure time setting means, gives a certain total light value; and means for moving said exposure time setting means between said consecutive positions, said moving means operatively connected with said diaphragm setting means for continuously adjusting the diaphragm setting means between two spaced end positions so as to continuously and gradually change the diaphragm aperture at least during such intervals when the exposure times set by said exposure time setting means in the respective positions thereof remain unchanged, and to suddenly change the diaphragm aperture during actual movement of the exposure time setting means from one position into the next position.

21. A combination as set forth in claim 18, wherein the range between the minimum and maximum magnitudes of the diaphragm aperture in each consecutive period of movement of said diaphragm setting means at least partially overlaps the range between the minimum and maximum magnitudes of the diaphragm aperture in the preceding period of movement of said diaphragm setting means.

22. A combination as set forth in claim 18, wherein the length of exposure time which remains constant at least during a substantial part of each consecutive period of movement of said exposure time setting means is less than the length of exposure time which remains constant during a substantial part of the preceding period of movement of said exposure time setting means.

23. A combination as set forth in claim 18, wherein said means for simultaneously moving said exposure time setting means and said diaphragm setting means are manually operable actuating means.

24. In a camera, in combination, movable exposure time setting means adapted to set during each of a plurality of consecutive periods of its movement a different exposure time which remains constant during at least a substantial part of the respective period of said movement; movable diaphragm setting means adapted to provide during each of a plurality of consecutive periods of its movement a diaphragm aperture which varies between substantially equal minimum and maximum magnitudes at least during a substantial part of the respective period of said movement of said movable diaphragm setting means; and means for simultaneously moving said exposure time setting means and said diaphragm setting means in such a manner that their consecutive periods of movement coincide whereby, during each of said substantial parts of the periods of movement of said exposure time and diaphragm setting means, the respective exposure time will remain unchanged while the diaphragm aperture will vary continuously between said substantially equal minimum and maximum magnitudes.

References Cited in the file of this patent

UNITED STATES PATENTS

| | | |
|---|---|---|
| 2,129,561 | Brueck | Sept. 6, 1938 |
| 2,326,077 | Steiner | Aug. 3, 1943 |
| 2,341,387 | Riddell | Feb. 8, 1944 |
| 2,465,578 | Czarnikow | Mar. 29, 1949 |
| 2,467,946 | Rossmann | Apr. 19, 1949 |
| 2,868,095 | Gebele | Jan. 13, 1959 |
| 2,906,186 | Gorey | Sept. 29, 1959 |
| 2,913,969 | Faulhaber | Nov. 24, 1959 |
| 2,913,972 | Cade | Nov. 24, 1959 |
| 2,990,758 | Sauer | July 4, 1961 |